(12) United States Patent
Saghbini et al.

(10) Patent No.: US 7,171,428 B1
(45) Date of Patent: Jan. 30, 2007

(54) TESTING SYSTEM WITH DATABASE-GENERIC FRONT END

(75) Inventors: Jean-Claude Saghbini, Cambridge, MA (US); Michael Dudnik, Watertown, MA (US)

(73) Assignee: EMC Corporation, Hopkinton, MA (US)

( * ) Notice: Subject to any disclaimer, the term of this patent is extended or adjusted under 35 U.S.C. 154(b) by 487 days.

(21) Appl. No.: 10/735,422

(22) Filed: Dec. 12, 2003

(51) Int. Cl.
*G06F 17/30* (2006.01)
(52) U.S. Cl. .................... 707/104.1; 707/102
(58) Field of Classification Search ........ 707/100, 707/101, 102, 104.1; 717/171; 710/72, 710/8; 702/17
See application file for complete search history.

(56) References Cited

U.S. PATENT DOCUMENTS

| 6,389,491 B1* | 5/2002 | Jacobson et al. ............ 710/62 |
| 6,606,744 B1* | 8/2003 | Mikurak ..................... 717/174 |
| 2002/0040288 A1* | 4/2002 | Yamoto et al. .............. 703/17 |

* cited by examiner

*Primary Examiner*—Apu M. Mofiz
(74) *Attorney, Agent, or Firm*—Fish & Richardson P.C.

(57) ABSTRACT

A testing system includes a software module for interacting with a subject database application and a common user-interface that controls the interaction of the software module. The common-user interface is independent of the subject database application.

22 Claims, 4 Drawing Sheets

```
int DbInit(
    T_DBIO_HANDLE *dbHandleP,
    int devicesCount,
    T_DBIO_STRING devices[],
    T_DBIO_DMS_ENV *dbmsEnvP,
    int dbSize
    T_DBIO_STRING logFile
);
```

FIG. 2

```
int DbInitCopy(
    T_DBIO_HANDLE *dbHandleP,
    int devicesCount,
    T_DBIO_STRING devices[],
    T_DBIO_DEVICE_PAIR devicePairs[],
    T_DBIO_HANDLE *dbCopyHandleP
);
```

FIG. 3

```
int DbConnect(
    T_DBIO_HANDLE *dbHandleP,
    T_DBIO_DMS_ENV *dbmsEnvP,
    T_DBIO_STRING dbName,
    T_DBIO_STRING logFile
);
```

FIG. 4

```
int dBWrite(
    T_DBIO_HANDLE *dbHandleP,
);
```

FIG. 5

```
int dBRead(
    T_DBIO_HANDLE *dbHandleP,
);
```

FIG. 6

```
int DbWriteBlock(
    T_DBIO_HANDLE *dbHandleP,
    char *blockP,
    int blockSize
);
```

FIG. 7

```
int DbReadBlock(
    T_DBIO_HANDLE *dbHandleP,
    char *blockP,
    int blockSize
);
```

FIG. 8

```
int DbVerify(
    T_DBIO_HANDLE *dbHandleP,
);
```

FIG. 9

```
int DbSetSplitTime(
    T_DBIO_HANDLE *dbHandleP,
);
```

FIG. 10

```
int DbGetName(
    T_DBIO_HANDLE *dbHandleP,
    T_DBIO_STRING dbName
);
```

FIG. 11

```
int DbDestroy(
    T_DBIO_HANDLE *dbHandleP,
);
```

FIG. 12

TESTING SYSTEM WITH DATABASE-GENERIC FRONT END

TECHNICAL FIELD

This invention relates to testing systems, and more particularly to systems for testing database operation.

BACKGROUND

Developers of data processing hardware or software systems recognize that those systems are likely to be used to interact with databases. It is therefore prudent for such developers to extensively test their products in a way that exercises the ability of those products to interact with those databases.

Because database programming is a somewhat arcane art, it is often necessary for such developers to engage the services of specialists in particular databases. At great cost to the developer, these specialists use the developer's products to create test databases, to read and write test data to those databases, and to otherwise fully exercise the developer's product in connection with a particular database application.

The foregoing testing methods impose costs on developers. These costs are further magnified by the recognition that there exists not one but many database applications, all of which will need to be tested. It is therefore desirable to provide the developer with an alternative testing procedure that avoids these costs.

SUMMARY

In one aspect, the invention includes a testing system having back-end software for interacting with a subject database application and a common user-interface for controlling the interaction of the back-end software with the subject database application. The common user-interface is independent of the subject database application.

Various types of common user-interfaces can be defined. Among these are an API interface, a C language interface, a command line interface, and a graphical-user interface.

A variety of features can be included in the back-end software. For example, the back-end software can include instructions for causing creation of a test database using a particular subject database application, instructions for populating the test database with test data, and instructions for reading test data from a test database.

The back-end software can also include instructions for comparing the test database with a copy of the test database. For example, the instructions can include instructions for ascertaining a procedure used for populating the test database with test data, and verifying the integrity of the copy of the test database on the basis of this ascertained procedure. This enables the copy of the test database to be verifiable even in the absence of the test database.

In another embodiment, the back-end software includes instructions for causing a selected portion of the test database to be compared with a copy of the test database.

Another aspect of the invention is a method for testing operation of a test subject with any one of a plurality of subject database applications. The method includes selecting a subject database application and providing back-end software for causing the test subject to interact with the selected subject database application. A common user-interface is then provided for controlling the back-end software. This common user-interface is independent of the selected subject database application.

Yet another aspect of the invention includes a computer-readable medium having encoded on it software for causing a test subject to interact with one of a subject database application selected from a plurality of database applications. The software includes back-end software for causing the interaction of the test subject with the selected subject database application; and a common user-interface for controlling the interaction of any one of the back-end modules. The common user-interface is independent of the subject database application.

In yet another aspect, the invention includes a system for testing the interaction of a test subject with a subject database application. The system includes database specific back-end software for interacting with a database application, and database neutral front-end software for controlling the back-end software. The front-end software is independent of the subject database application.

DESCRIPTION OF THE DRAWINGS

FIGS. 2–12 are C-language headers for selected functions of the testing system.

DETAILED DESCRIPTION

Figure 1:
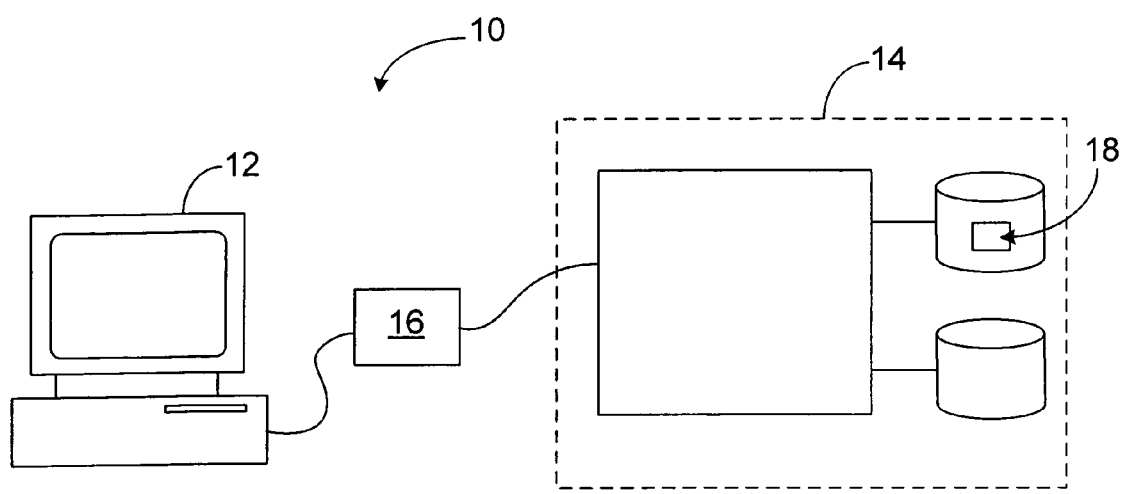
FIG. 1 shows an example of a system in which the testing system of the invention is implemented.

FIG. 1 shows a typical data processing system 10 in which a host 12 connects to a data-storage system 14 through a switch 16. The host 12 can be a server or it can itself be another data-storage system, in which case the data-storage system 14 functions as a back-up data-storage system. As used herein, the term "host" refers to any data processing system that provides data to be stored in the data-storage system 14. A user at the host 12 interacts with a database 18 stored on the data storage system by reading and/or writing data, or by performing various other operations.

A manufacturer or developer of any one of the components shown in FIG. 1, or any constituents thereof, will generally test that component by performing a sequence of database exercises. As used herein, the terms "component" and "test subject" include any one or more of the components shown in FIG. 1 and/or the constituents thereof. The terms "component" and "test subject" are not restricted to hardware components and can include, for example, software executing on any of the components shown in FIG. 1.

Exemplary database exercises to be performed in testing a component can include creating databases, reading and writing to those databases, copying databases, and the like. During the test procedure, the manufacturer confirms that no errors have occurred in connection with these database exercises. In this context, the nature of the data itself is largely irrelevant. What is important is that the database exercises be performed correctly.

A testing system for testing the operation of a component with a database application (hereafter the "subject database-application") includes a database-neutral front-end and a database-specific back-end. The database-neutral front-end, which is all that the tester experiences, is independent of the particular subject database-application. The database-specific back-end, which implements the commands that the tester communicates to the front-end, calls the particular database functions required to carry out those commands.

One embodiment of the testing system provides the tester with a front-end that uses a familiar C-programming interface. A tester charged with the task of creating a procedure for testing the component would thus encounter a task similar to that of writing a C program that interfaces with a simple API, rather than the more difficult task of writing procedures in a database programming environment. A basic set of API function calls from the front-end of an exemplary testing system can include one or more of the following:

| | |
|---|---|
| DbInit( ) | Creates a test database and provides a handle thereto. |
| DbInitCopy( ) | Provides a handle to a copy of the test database. |
| DbConnect( ) | Provides a new handle to an existing test database. |
| DbWrite( ) | Writes a test data record to the test database. |
| DbRead( ) | Reads a test data record from the test database. |
| DbWriteBlock( ) | Writes a block of test data to the test database. |
| DbReadBlock( ) | Reads a block of test data from the test database. |
| DbVerify( ) | Confirms the integrity of a copy of the test database |
| DbSetSplitTime( ) | Specifies a time after which any data written to the test database is to be ignored when verifying the integrity of a copy of the test database. |
| DbDestroy( ) | Closes an existing handle to a test database. |
| DbGetName( ) | Obtains the name of a test database given its handle. |

The detailed operation of the foregoing function calls is discussed below in connection with FIGS. 2–12.

DbInit( )

A call to the DbInit( ) function performs the various tasks associated with creating a test database. The DbInit( ) function creates and starts an instance of a test database on the host. It then creates the test database itself, as well as its associated table space and a table. The DbInit( ) function then creates a handle for accessing the test database and returns a value indicating its completion, and optionally, information indicative of any errors encountered during its execution.

When expressed in C, the header to the DbInit( ) function is as shown in FIG. 2. Consistent with C programming syntax, the first token associated with an argument specifies the data-type of the value specified by the second token associated with that argument. By convention, an asterisk "*" immediately preceding a second token indicates a pointer to the value specified by the second token.

A call to the DbInit( ) function creates an instance of a test database and provides a pointer to a handle for that database. The value dbHandleP is a data structure of type T_DBIO_HANDLE. This data structure holds all information necessary to access the test database.

A tester may want to test particular storage media or the interaction of a component with particular storage media. To do so, the tester specifies the particular storage media on which the test database is to be stored. The tester does so by providing DbInit( ) with: an array, devices[ ], that lists the physical location(s) to be occupied by test database; and an integer, devicesCount, that specifies how many devices are listed in that array. This array includes a listing of devices, logical volumes files, and/or directories that are to hold the test database. The array devices[ ] is an array of characters, T_DBIO_STRING, that is large enough to hold the names of the test database and all the devices on which that test database is to reside. When creating an object of type T_DBIO_STRING, it is good practice to initialize the entries to be nil.

In addition to specifying where the test database is to be placed, the tester specifies certain properties of the test database. These properties include the size of the test database, dbSize, and a pointer to a data structure, dbmsEnvP, that specifies such data as: the DBMS environment, a host directory, an associated username, and a password.

The remaining argument, logFile, is another character array for recording information describing all actions performed by the various functions that make up the API.

The DbInit( ) function returns an integer that, depending on its value, indicates either the function's successful completion or a failure. The value that indicates a failure can be selected to indicate the particular reason for the failure mode that caused the failure. The particular failure modes depend in part on the subject database-application. In the case of ORACLE™ databases, exemplary failure modes that can be identified with particular return values include: a failure in making the home database director, a failure in defining data files, a failure in setting up file permissions, a failure in creating the database, a failure in logging onto the database, and a failure in writing the init.ora file.

DbInitCopy( )

Many data storage systems routinely maintain a copy of a test database. It is therefore desirable, in testing a component for compatibility with a subject database-application, to ensure that the component functions correctly when operating with both the test database itself and any copies thereof. This requires obtaining a handle to the copy of the test database. A call to DbInitCopy( ) creates such a handle.

A call to DbInitCopy( ) performs essentially the same tasks as a call to DbInit( ), except that DbInitCopy( ) provides a handle to the copy of the test database.

When expressed in C, the header to the DbInitCopy( ) function is as shown in FIG. 3.

A call to DbInitCopy( ) provides a pointer to a handle, dbCopyHandle, that enables access to a copy of a test database. The first three arguments to DbInitCopy( ) are input arguments like those provided in the call to DbInit( ) to obtain a handle for the test database. These arguments are explained above in connection with the discussion of DbInit( ). The remaining argument, devicepairs[ ], is an array showing correspondence between the devices specified in devices[ ] (referred to in this context as "source devices") and corresponding devices on which the copy of the test database is maintained (referred to in this context as "target devices"). The array devices[ ] is of type T_DBIO_DEVICE_PAIR, which is a data structure for holding a list of target devices corresponding to the source devices, as well as information indicative of which source device each target device in devices[ ] corresponds to.

The DbInitCopy( ) function returns an integer that, depending on its value, indicates the function's successful completion or a failure. The returned integer value that indicates a failure can be selected to indicate the reason, or failure mode, for the failure. The particular failure modes depend in part on the subject database-application. In the case of ORACLE™ databases, exemplary failure modes that can be identified with particular return values include: an invalid handle to the test database, a failure in setting up file permissions, a failure in reading the init.ora file associated with the test database, a failure in reconstructing the data files, a failure in creating the home database directory, a failure in defining data files, a failure in setting up file permissions, a failure in creating the copy of the test database, a failure in logging onto the copy of the test database, a failure in renaming an instance of the test database and a failure in writing the init.ora file for the copy of the test database.

DbConnect( )

The DbConnect( ) function provides a way to obtain a handle to a test database without having to actually create the test database, as would be the case if one were to use DbInit( ). When expressed in C, the DbConnect( ) function is as shown in FIG. 4.

The first, second and last arguments are the same as those provided to DbInit( ) for obtaining the the handle for the test database. These arguments are explained above in connection with the discussion of DbInit( ). The remaining argument, dbName, is the name of the existing test database for which a handle is sought.

The DbConnect( ) function returns an integer value that indicates, depending on its value, either the function's successful completion or a failure to complete successfully. The returned integer value can be selected to identify particular failure modes. Exemplary failure modes that can be identified with particular return values include: an invalid dbHandleP, a failure in setting up an environment, or a failure in logging onto the database.

DbWrite( )

The dBWrite( ) function writes a test data record record to a test database. When expressed in C, the header to the dBWrite( ) function is as shown in FIG. 5. The dbHandleP identifies the test database that is to be written to.

The DbWrite( ) function returns an integer value that indicates either the function's successful completion or its failure to complete successfully. In the case of a failure to complete successfully, the integer value can be selected to identify a particular failure mode.

Exemplary failure modes that can be identified with particular return values include: an invalid dbHandleP, a failure in allocating a table, a failure in creating the table, and a failure in inserting data into the table.

DbRead( )

The dBRead( ) function reads a test data record from a test database. When expressed in C, the header to the dBRead( ) function is as shown in FIG. 6. The dbHandleP argument identifies the test database that is to be read from.

The DbRead( ) function returns an integer value selected to indicate either the function's successful completion or its failure to complete successfully. The value indicating a failure can be selected to indicate a particular failure mode. Exemplary failure modes that can be identified with particular return values include: an invalid dbHandleP, and a failure in selecting a row from the table.

DbWriteBlock( )

The DbWriteBlock( ) function writes a block of data to a test database. When expressed in C, the header to the DbWriteBlock( ) function is as shown in FIG. 7.

The actual data to be written is provided by DbWriteBlock( ) and therefore need not be specified by the tester. Thus, all that is required to call the DbWriteBlock( ) function is a handle dbHandleP to identify the test database that is to be written to, and some information identifying the test data and indicating the location and extent of the block.

The dbHandleP argument identifies the test database that is to be written to. The arguments blockP and blockSize together specify the location and extent of the block. In particular, the argument blockP points to the first character of the block that is to be written, and the argument blockSize specifies how many bytes are in that block.

The DbWriteBlock( ) function returns an integer value that indicates either the function's successful completion or its failure to complete successfully. The integer value indicating a failure can be selected to indicate a particular failure mode. Exemplary failure modes that can be identified with particular return values include: an invalid dbHandleP, a failure in allocating a table, a failure in creating the table, a failure in inserting data into the table, inability to access a block field, and inability to access a table field.

DbReadBlock( )

The DbReadBlock( ) function reads a block of data from a test database. When expressed in C, the header to the DbReadBlock( ) function is as shown in FIG. 8.

The input dbHandleP argument identifies the test database to be read from. The output values blockP and blockSize together specify the location and extent of the block. In particular, the output value blockP identifies the test data block that is to be read, and the output value blockSize specifies how many bytes are in the block.

The DbReadBlock( ) function returns an integer value that indicates either the function's successful completion or a failure. The integer value indicating a failure can be selected to indicate the particular failure mode. Exemplary failure modes that can be identified with particular return values include: an invalid dbHandleP, and a failure in selecting a row from a table.

In an optional feature of the invention, any of the functions DbReadBlock( ) and DbWriteBlock( ) can be modified to allow specification of the type of read or write. Examples of reads and writes include the reading and writing randomly located data of or sequentially located data, as well as the reading and writing of large or small amounts of data.

DbVerify( )

The DbVerify( ) function determines whether a test database is identical to its copy. When expressed in C, the header to the DbVerify( ) function is as shown in FIG. 9.

The dbHandleP argument identifies a copy of the test database. Using information contained in the handle, the DbVerify( ) function determines what was in the test database. Note that it is not necessary to access the test database itself to perform the comparison. This is because the data contained within the test database was generated by another function within the API interface.

The DbVerify( ) function returns an integer value that, depending on its value, indicates that the database is valid and invalid. Other integer values returned by DbVerify( ) indicate additional failure modes. Exemplary failure modes that can be identified with particular return values include an invalid dbHandleP.

DbSetSplitTime( )

In some cases, the tester may wish to write data to the test database after a copy of the test database has already been made. If the tester does so, the DbVerify( ) function may indicate that the test database and its copy are inconsistent. This is because the copy of the test database may not have been updated to include the data added or changed after the test database is copied.

To avoid this, the tester executes the DbSetSplitTime( ) function to associate a split time with a test database. When asked to verify a copy of the test database, the DbVerify( ) function can then inspect the split time associated with the test database and ignore the absence of any changes to the test database that were made after the split time.

When expressed in C, the header to the DbSetSplitTime( ) function is as shown in FIG. 10. The sole input argument, dbHandleP, identifies the test database.

The DbSetSplitTime( ) function returns an integer value that indicates either the function's successful or its failure to complete successfully. The integer value indicating a failure can be selected to indicate a particular failure mode that led to the failure. Exemplary failure modes that can be identified with particular return values include an invalid dbHandleP.

DbGetName( )

The DbGetName( ) function obtains the name of a test database corresponding to an existing handle. When expressed in C, the header to the DbGetName( ) function is as shown in FIG. 11.

The dbHandleP argument identifies an existing handle to a test database. The output value dbName is a null-terminated string containing the name of the test database associated with the input handle dbHandleP.

The DbGetName( ) function returns an integer value that indicates either the function's successful or its failure to complete successfully. The integer value indicating a failure can be selected to indicate a particular failure mode that led to the failure. Exemplary failure modes that can be identified with particular return values include an invalid dbHandleP.

DbDestroy( )

The DbDestroy( ) function closes a handle to a test database. When expressed in C, the header to the DbDestroy( ) function is as shown in FIG. 12.

The dbHandleP argument, which is discussed above in connection with DbInit( ), identifies an existing handle that is to be closed.

The DbDestroy( ) function returns an integer value that indicates either the function's successful or its failure to complete successfully. The integer value indicating a failure can be selected to indicate a particular failure mode that led to the failure. Exemplary failure modes that can be identified with particular return values include an invalid dbHandleP.

The foregoing description and the accompanying figures describe a particular front-end interface that is intended for use by a tester familiar with the C programming language. However, the front-end interface can be expressed in any programming language. In addition, the front-end interface can provide function calls in the form typically used in a command line interface. Such function calls can then be executed in sequence either manually or automatically in a script.

The front-end interface can also be a graphical user interface having, for example, a scrolling list to select functions, dialog boxes for specifying the arguments to those functions. Alternatively, the graphical user interface can include tabbed dialog boxes with a tab corresponding to teach API function. In such a case, the arguments to a particular API function can be specified through the tab.

In one implementation, a separate test system is provided for each subject database-application. The separate test systems would each present the same front-end to the user. Each one would have a back-end tailored to a particular subject database-application. However, in another implementation, a single test systems includes back-ends tailored to two or more subject database-applications. In such a case, the front-end includes a tester-specified setting to select which of the included back-ends is to be active.

In yet another implementation, the test system has two or more tester interfaces with a user-settable control for activating a particular tester interface. This enables a tester to select from, for example, a C-language interface, a command line interface, or a graphical user interface.

Having described our invention, and a preferred embodiment thereof, what we claim as new, and secured by Letters Patent is:

1. A testing system comprising:
   back-end software for interacting with a subject database application, wherein the back-end software includes instructions for causing creation of a test database using a particular subject database application, populating the test database with test data; comparing the test database with a copy of the test database by ascertaining instructions used for populating the test database with test data, and verifying the integrity of the copy of the test database on the basis of the populating instructions; and
   a common user-interface for controlling the interaction of the back-end software with the subject database application, the user-interface being independent of the subject database application
   whereby the copy of the test database is verifiable while the test database is unavailable.

2. The testing system of claim 1, wherein the common user-interface comprises an API interface.

3. The testing system of claim 2, wherein the API interface comprises a C language interface.

4. The testing system of claim 1, wherein the common user-interface comprises a command line interface.

5. The testing system of claim 1, wherein the common user-interface comprises a graphical-user interface.

6. The testing system of claim 1, wherein the back-end software includes instructions for reading test data from the test database.

7. The testing system of claim 1, wherein the back-end software includes instructions for causing a selected portion of the test database to be compared with a copy of the test database.

8. A method for testing operation of a test subject with any one of a plurality of subject database applications, the method comprising:
   selecting a subject database application;
   providing back-end software for causing the test subject to interact with the selected subject database application, the back-end software including instructions for causing creation of a test database using a particular subject database application; instructions for populating the test database with test data; instructions for comparing the test database with a copy of the test database by ascertaining a procedure used for populating the test database with test data, and verifying the integrity of the copy of the test database on the basis of the procedure; and
   providing a common user-interface for controlling the back-end software, the user-interface being independent of the selected subject database application;
   whereby the copy of the test database is verifiable while the test database is unavailable.

9. The method of claim 8, wherein providing a common user-interface comprises providing an API interface.

10. The method of claim 9, wherein providing a common user-interface comprises providing a C language interface.

11. The method of claim 8, wherein providing a common user-interface comprises providing a command line interface.

12. The method of claim 8, wherein providing a common user-interface comprises providing a graphical-user interface.

13. The method of claim 8, wherein providing the back-end software comprises providing instructions for reading test data from a test database.

14. The method of claim 8, wherein providing the back-end software comprises providing instructions for causing a selected portion of the test database to be compared with a copy of the test database.

15. A computer-readable medium having encoded thereon software for causing a test subject to interact with a subject database application selected from a plurality of database applications, the software comprising:
   back-end software for causing the interaction of the test subject with the selected subject database application, the back-end software including instructions for causing creation of a test database using a particular subject database application; the instructions for causing creation of a test database including instructions for populating the test database with test data, and instructions for comparing the test database with a copy of the test database, the instructions for comparing the test database with a copy of the test database including instructions for ascertaining a procedure used for populating the test database with test data, and for verifying the integrity of the copy of the test database on the basis of the identified procedure; and
   a common user-interface for controlling the interaction of any one of the back-end modules, the common user-interface being independent of the subject database application;
   whereby the copy of the test database is verifiable while the test database is unavailable.

16. The computer-readable medium of claim 15, wherein the instructions for providing a common user-interface comprise instructions for providing an API interface.

17. The computer-readable medium of claim 16, wherein the instructions for providing a common user-interface comprise instructions for providing a C language interface.

18. The computer-readable medium of claim 15, wherein the instructions for providing a common user-interface comprise instructions for providing a command line interface.

19. The computer-readable medium of claim 15, wherein the instructions for providing a common user-interface comprise instructions for providing a graphical-user interface.

20. The computer-readable medium of claim 15, wherein the back-end software comprises instructions for reading test data from a test database.

21. The computer-readable medium of claim 15, wherein the back-end software comprises instructions for providing instructions for causing a selected portion of the test database to be compared with a copy of the test database.

22. A system for testing the interaction of a test subject with a subject database application, the system comprising:
   database specific back-end software for interacting with a database application, the back-end software including instructions for causing creation of a test database using a particular subject database application; the instructions for causing creation of a test database including instructions for populating the test database with test data, and instructions for comparing the test database with a copy of the test database, the instructions for comparing the test database with a copy of the test database including instructions for ascertaining a procedure used for populating the test database with test data, and for verifying the integrity of the copy of the test database on the basis of the identified procedure; and
   database neutral front-end software for controlling the back-end software, the front-end software being independent of the subject database application.

* * * * *